T. T. PARKER.
FEED WATER HEATER AND PURIFIER.
APPLICATION FILED OCT. 4, 1919.
1,352,023.
Patented Sept. 7, 1920.
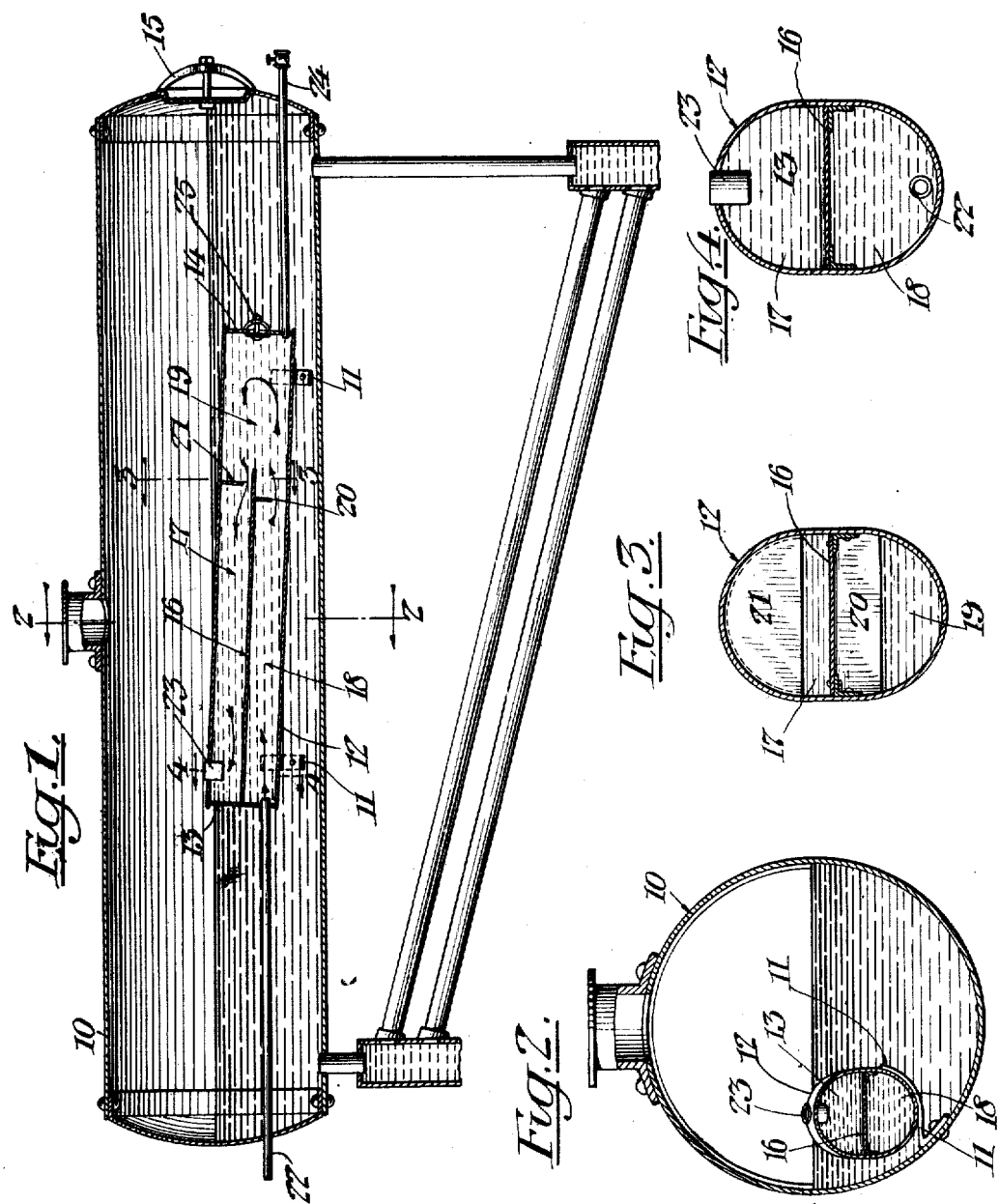
Inventor
Thomas T. Parker
by his Attorney
John R. Nolan

UNITED STATES PATENT OFFICE.

THOMAS T. PARKER, OF BROOKLYN, NEW YORK.

FEED-WATER HEATER AND PURIFIER.

1,352,023.

Specification of Letters Patent.   Patented Sept. 7, 1920.

Application filed October 4, 1919. Serial No. 328,464.

*To all whom it may concern:*

Be it known that I, THOMAS T. PARKER, a citizen of the United States, and resident of the city of New York, borough of Brooklyn, in the county of Kings and State of New York, have invented certain new and useful Improvements in Feed-Water Heaters and Purifiers, of which the following is a specification.

This invention relates to a feed-water heater and purifier for steam boilers, and particularly to an apparatus for separating oil and other floating and suspended matter from feed-water preparatory to the delivery of the water to the boiler proper.

According to my invention, in its preferred form of embodiment, I locate within and longitudinally of the steam and water drum of the boiler, either above or intersecting the line of the boiler water, a closed vessel having a plurality of longitudinally-extending water passes and a common junction chamber therefor at one end of the vessel, the said passes having baffles therein adjacent the chamber. The end portion of the vessel remote from the chamber is provided with a feed-water inlet leading to one pass and with a feed-water outlet leading to the boiler from the other pass. Hence feed-water, relatively cooler than the boiler water, being supplied to one of the longitudinal passes by way of the inlet, flows along said pass to the junction chamber at the opposite end of the vessel, and then enters the other pass and flows reversely thereof to the outlet, whence it finally escapes through to the outlet, whence it finally escapes to the boiler water. The temperature of the feed water is progressively raised in its extended flow through the passes of the vessel, and in consequence oil and other floating and suspended matter are caused to rise to or near the top of the water in its travel, and thus are intercepted by the opposing baffles and prevented from escaping to the boiler water. A suitable blow-off to facilitate the occasional removal of the oil and other accumulations from the vessel is provided.

The invention also comprises various novel features of construction and arrangements of parts which will be hereinafter described and claimed.

In the annexed drawings—

Figure 1 is a longitudinal vertical section of a boiler drum equipped with a feed-water structure embodying the principle of my invention.

Fig. 2 is a transverse section through the drum and the contained feed-water structure, as on the line 2—2 of Fig. 1.

Figs. 3 and 4 are enlarged transverse sections of the feed-water structure, as on the lines 3—3 and 4—4, respectively, of Fig. 1.

Referring to the drawings, 10 designates the horizontal steam and water drum of a steam boiler of any usual or approved type. Within this drum, preferably at one side thereof, is supported by means, for example, of a strap or bracket 11, a longitudinally-extending vessel 12 closed at its respective ends by heads 13, 14. The vessel is located just above or is partly submerged in the boiler water, so as to be subjected to a high temperature. Preferably the vessel 12 is in the form of a drum of elliptical cross-section so proportioned as to be readily insertible into the boiler drum through the usual manhole 15 in the latter; but it is to be understood that with some types of boilers the vessel may be of cylindrical or rectangular construction.

The interior of the vessel 12 is provided with a generally horizontal partition or division wall 16 which extends from the head 13 toward, and terminates somewhat in advance of the opposite head 14 of the vessel, thus establishing upper and lower longitudinal water passes 17, 18 respectively, connected at one end by a common or junction chamber 19.

The underside of the division plate is provided adjacent the junction chamber with a depending plate 20 which terminates somewhat above the floor of the pass 18 and thus constitutes a baffle; and the wall of the casing constituting the top or roof of the pass 17 is provided adjacent the junction chamber with a similar baffle plate 21 which terminates above the division wall. Each of the longitudinal passes may, if desired, be provided throughout its length with a plurality of similar baffle plates arranged in spaced relation to each other.

A feed-water supply pipe 22 extends through the head 13 of the vessel into the lower pass 18; an outlet pipe 23 depends through the casing into the upper pass in proximity to the head 13 and a blow-off pipe 24 extends through the head 14 from the junction chamber.

The head 14 is also provided, above the blow-off outlet, with a hand-hole 25, or the like, to facilitate access to the interior of the vessel 12 for cleaning, inspection or repair, as occasion may require.

From the foregoing described simple and durable construction it will be seen that as the relatively cool feed-water enters the pass 18, which is larger in cross-section, than the inlet pipe, the velocity of the water is greatly reduced, and hence it rapidly absorbs the heat transmitted thereto from the external boiler water. The resulting voluminal expansion of the feed-water assists in the separation and ascent of the oil or other floating or suspended content of the water, and in consequence a considerable portion of the floating matter encounters the depending baffle 20 and is trapped thereby, while the water which underflows such baffle enters the junction chamber. Since the chamber 19 is much larger in cross section than the pass 18, (being equal to that of the vessel), the velocity of the feed water when it enters the junction chamber is again reduced. Thereupon such water rises above the division wall and, underflowing the baffle 21, flows in a reverse direction into and along the upper pass 17. The baffle 21 thus retains in the vicinity of the junction chamber any opposing floating or suspended matter that may have escaped the baffle 20 of the lower pass. The increased temperature of the water when it reaches and slows down within the junction chamber contributes materially to the separation and rising of the floating or suspended matter therein. When the retarded feed-water flows back through the upper pass, as above described, and approaches the depending outlet pipe 23, the temperature of the water has been still further raised, and at the same time the water is constrained to pass downward to the lower open end of, and flow upward through the outlet pipe before escaping to the boiler water. The outlet pipe thus performs the additional function of a baffle to intercept and trap any floating or suspended matter that may be present in the water at this point.

It is to be noted that the feed-water inlet and outlet afford washout openings at one end of the vessel, and that the hand-hole and blow-off pipe provide similar openings at the opposite end of the vessel, the outlet and hand-hole severally permitting the ready introduction of a hose into the vessel in order to enable the thorough cleaning of the interior of the latter from end to end, as occasion may require.

When the valve of the blow-off pipe is opened, the pressure of the boiler steam entering the vessel 12 through the outlet pipe 23, effects the release of the accretions at the baffles and such matter passes down to and escapes through the blow-off pipe to a convenient place of discharge. Likewise mud or other residue that may be deposited within the junction chamber may be blown off.

Preferably the elongated vessel 12 is inclined, and its lower end provided with the blow-off pipe as shown, but in some constructions the vessel may of course be horizontal.

My invention not only provides a simple, inexpensive and reliable oil extractor and purifier for the feed-water of boilers, but it also provides an efficient means for preheating such water before its delivery to the boiler water.

I do not limit myself to the specific details of construction disclosed, as the same may be varied within the principle of my invention and the scope of the appended claims.

I claim—

1. In a feed-water heating and purifying structure for steam boilers, the combination with a steam and water drum, of an elongated casing having closed ends and arranged within and longitudinally of said drum, a horizontal partition within said casing extending from one of said ends toward and terminating short of the other end, to provide upper and lower longitudinal water passes, and also a common junction chamber therefor at one end of the casing, a feed-water supply inlet for the lower pass, a discharge outlet for the upper pass, said inlet and outlet being at the end of the casing remote from the junction chamber, and depending baffles located within said passes in proximity to the junction chamber.

2. In a feed-water heating and purifying structure for steam boilers, the combination with a steam and water drum, of an elongated casing having closed ends and arranged within and longitudinally of said drum, a horizontal partition within said casing extending from one of said ends toward and terminating short of the other end, to provide upper and lower longitudinal water passes, and also a common junction chamber therefor at one end of the casing, depending baffles in said passes, a feed-water supply pipe leading into the lower pass, and an outlet pipe depending into the upper pass, said pipes being at the end of the casing remote from the junction chamber, and a blow-off pipe extending from the lower part of said chamber.

Signed at New York, in the county and State of New York this 3rd day of October A. D. 1919.

THOMAS T. PARKER.